US010832297B2

(12) United States Patent
Johnson et al.

(10) Patent No.: US 10,832,297 B2
(45) Date of Patent: Nov. 10, 2020

(54) REAL-TIME PRICED (RTP) CELLULAR SERVICE MARKETPLACE

(71) Applicant: Aeris Communications Inc., San Jose, CA (US)

(72) Inventors: Drew S. Johnson, San Jose, CA (US); Yixiang Chen, Palo Alto, CA (US); Dae Seong Kim, Campbell, CA (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 47 days.

(21) Appl. No.: 16/003,136

(22) Filed: Jun. 8, 2018

(65) Prior Publication Data

US 2018/0330414 A1     Nov. 15, 2018

Related U.S. Application Data

(63) Continuation of application No. 14/207,209, filed on Mar. 12, 2014, now Pat. No. 10,007,938.

(60) Provisional application No. 61/780,211, filed on Mar. 13, 2013.

(51) Int. Cl.
*G06Q 30/06* (2012.01)

(52) U.S. Cl.
CPC ................. *G06Q 30/0601* (2013.01)

(58) Field of Classification Search
CPC ................. G06Q 30/0601; G06Q 30/06
USPC ................................ 705/26.1, 26.2
See application file for complete search history.

(56) References Cited

U.S. PATENT DOCUMENTS

| 6,052,447 | A | 4/2000 | Golden |
| 6,112,101 | A | 8/2000 | Bhatia |
| 6,169,893 | B1 | 1/2001 | Shaheen |
| 6,208,978 | B1 | 3/2001 | Walker |
| 6,519,571 | B1 | 2/2003 | Guheen |
| 6,650,655 | B2 | 11/2003 | Alvesalo |
| 6,735,568 | B1 | 5/2004 | Buckwalter |
| 6,826,552 | B1 | 11/2004 | Grosser |

(Continued)

OTHER PUBLICATIONS

International Search Report from International Application No. PCT/US2014/026421 dated Jul. 29, 2014.

(Continued)

*Primary Examiner* — Andrew Joseph Rudy
(74) *Attorney, Agent, or Firm* — Brundidge & Stanger, P.C.

(57) ABSTRACT

A computer-implemented method and system for buying and selling cellular service in a market allowing real-time pricing is disclosed. The computer-implemented method and system comprise storing at least one offer to sell a specified quantity of cellular service (which may be voice minutes, messages, data or other available service parameters) initiated by a seller, and processing one or more requests to purchase cellular service initiated by one or more buyers. The processing of the requests to purchase cellular service further comprises implementing a method for matching one or more requests to purchase cellular service with any stored offers; wherein when a match occurs the buyer is able to purchase the desired quantity of cellular service. The computer-implemented method and system includes deducting the purchased quantity of cellular service from a service profile of the seller and adding the purchased quantity of cellular service to a service profile of the buyer.

30 Claims, 8 Drawing Sheets

(56) References Cited

U.S. PATENT DOCUMENTS

| | | |
|---|---|---|
| 6,909,708 B1 | 6/2005 | Krishnaswamy |
| 7,076,447 B1 * | 7/2006 | Peyser .................. G06Q 30/06 |
| | | 705/26.2 |
| 7,127,239 B2 | 10/2006 | Ogman |
| 7,228,141 B2 | 6/2007 | Sethi |
| 7,280,975 B1 | 10/2007 | Donner |
| 7,415,424 B1 | 8/2008 | Donner |
| 7,505,924 B1 | 3/2009 | Whitehead |
| 7,668,821 B1 * | 2/2010 | Donsbach .......... G06Q 30/0631 |
| | | 707/765 |
| 7,721,296 B2 | 5/2010 | Ricagni |
| 7,729,944 B1 * | 6/2010 | Peyser ............... G06Q 30/0635 |
| | | 705/26.81 |
| 7,797,193 B1 * | 9/2010 | Peyser ............... G06Q 30/0601 |
| | | 379/93.12 |
| 7,885,902 B1 | 2/2011 | Shoemaker |
| 7,987,260 B2 | 7/2011 | Rogers |
| 8,068,829 B2 | 11/2011 | Lemond |
| 8,280,395 B2 | 10/2012 | Tzamaloukas |
| 8,281,037 B2 | 10/2012 | Julia |
| 8,527,357 B1 | 9/2013 | Ganesan |
| 8,596,527 B2 * | 12/2013 | Bishop .................. G06Q 20/02 |
| | | 235/379 |
| 8,794,509 B2 * | 8/2014 | Bishop .................. G06Q 20/02 |
| | | 235/379 |
| 8,814,039 B2 * | 8/2014 | Bishop .................. G06Q 20/02 |
| | | 235/379 |
| 8,820,633 B2 * | 9/2014 | Bishop .................. G06Q 20/02 |
| | | 235/379 |
| 8,846,685 B2 * | 9/2014 | Gray .................... C07D 277/60 |
| | | 514/255.05 |
| 8,875,990 B2 * | 11/2014 | Bishop .................. G06Q 20/04 |
| | | 235/379 |
| 9,084,179 B2 * | 7/2015 | Visuri .................. H04W 48/16 |
| 9,288,831 B2 * | 3/2016 | Visuri .................. H04W 48/16 |
| 9,600,823 B2 * | 3/2017 | Lanciani ................ G06Q 30/02 |
| 9,609,459 B2 | 3/2017 | Raleigh |
| 9,787,644 B2 | 10/2017 | Mulhearn |
| 10,007,938 B2 * | 6/2018 | Johnson ............. G06Q 30/0601 |
| 10,083,411 B2 * | 9/2018 | Kinsey, II .......... G06Q 30/0627 |
| 2002/0006801 A1 | 1/2002 | Siren |
| 2002/0039892 A1 | 4/2002 | Lindell |
| 2007/0050224 A1 | 3/2007 | Malitski |
| 2007/0107016 A1 * | 5/2007 | Angel .................... G06Q 30/06 |
| | | 725/61 |
| 2008/0052189 A1 | 2/2008 | Walker et al. |
| 2008/0120160 A1 | 5/2008 | Woo et al. |
| 2010/0223159 A1 | 9/2010 | MacKay |
| 2010/0287062 A1 * | 11/2010 | Liang .................... G06Q 20/12 |
| | | 705/26.1 |
| 2011/0161182 A1 | 6/2011 | Racco |
| 2011/0208605 A1 | 8/2011 | Raccah et al. |
| 2011/0218924 A1 | 9/2011 | Addala |
| 2012/0150692 A1 | 6/2012 | Dueck |
| 2014/0052576 A1 * | 2/2014 | Zelenka ................. G06Q 30/00 |
| | | 705/26.41 |
| 2014/0089135 A1 * | 3/2014 | Linh ................. G06Q 30/0601 |
| | | 705/26.7 |
| 2014/0095706 A1 | 4/2014 | Raleigh |
| 2015/0223024 A1 | 8/2015 | Abuodeh |

OTHER PUBLICATIONS

Definition of "purchase", Collins English Dictionary—Complete & Unabridged 2012 Digital Edition viewed via www.dictionary.com/browse/purchase.

* cited by examiner

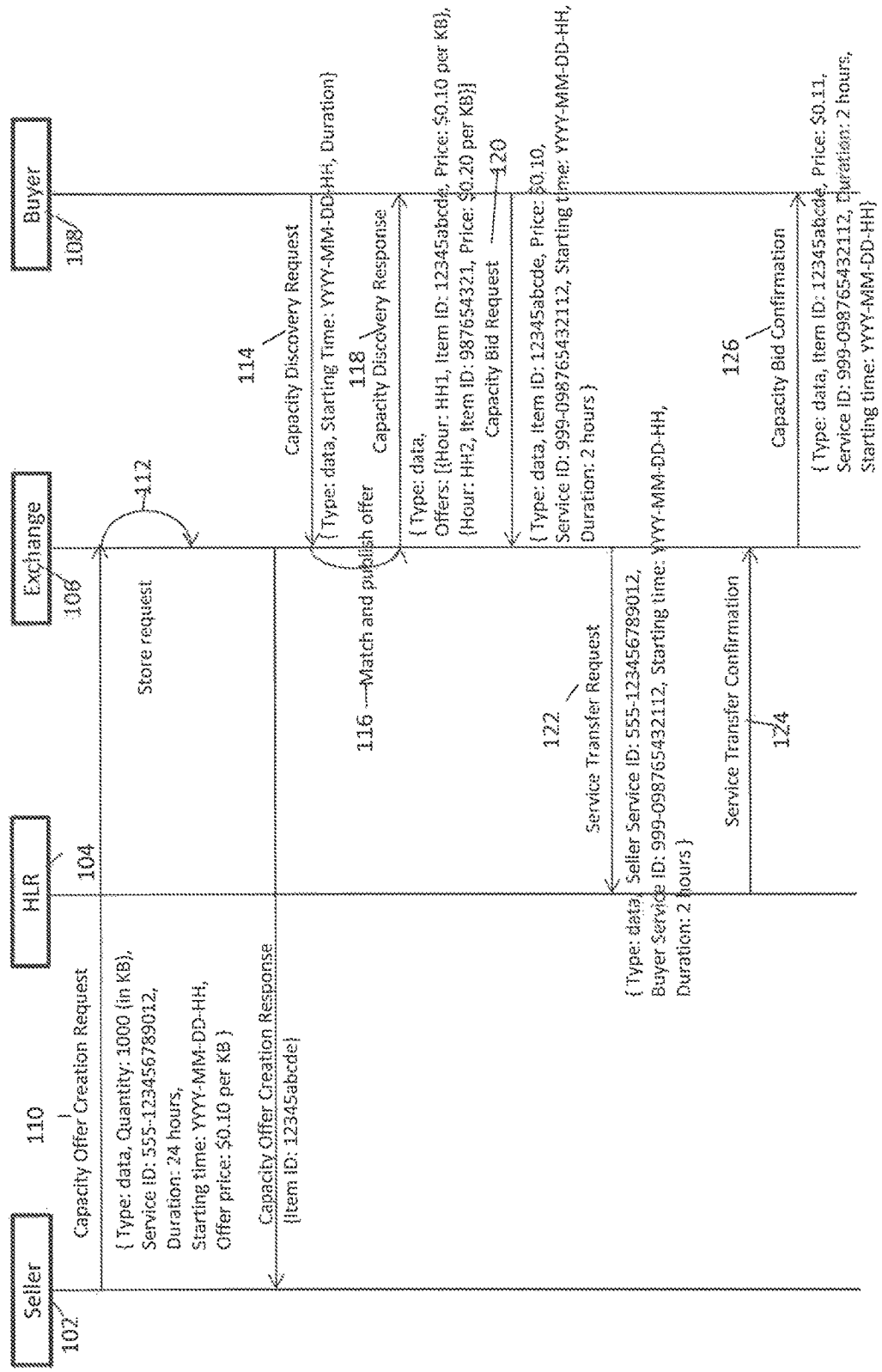

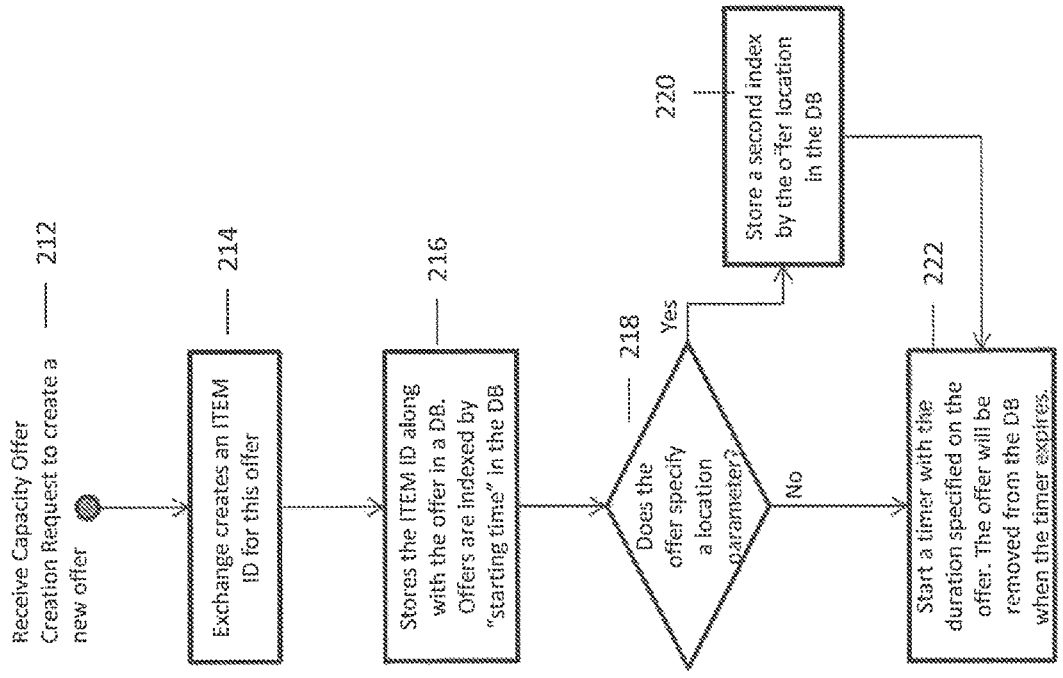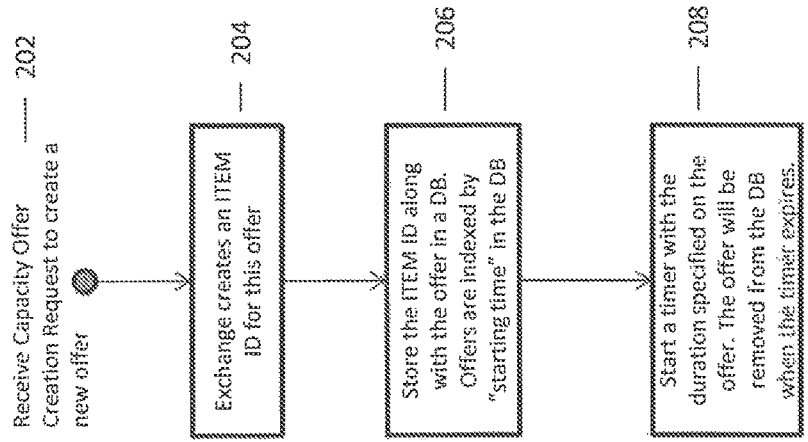

Bid Processing

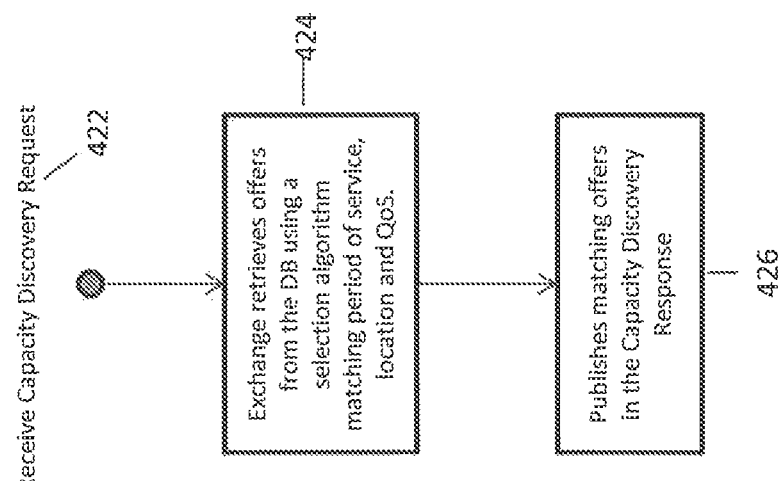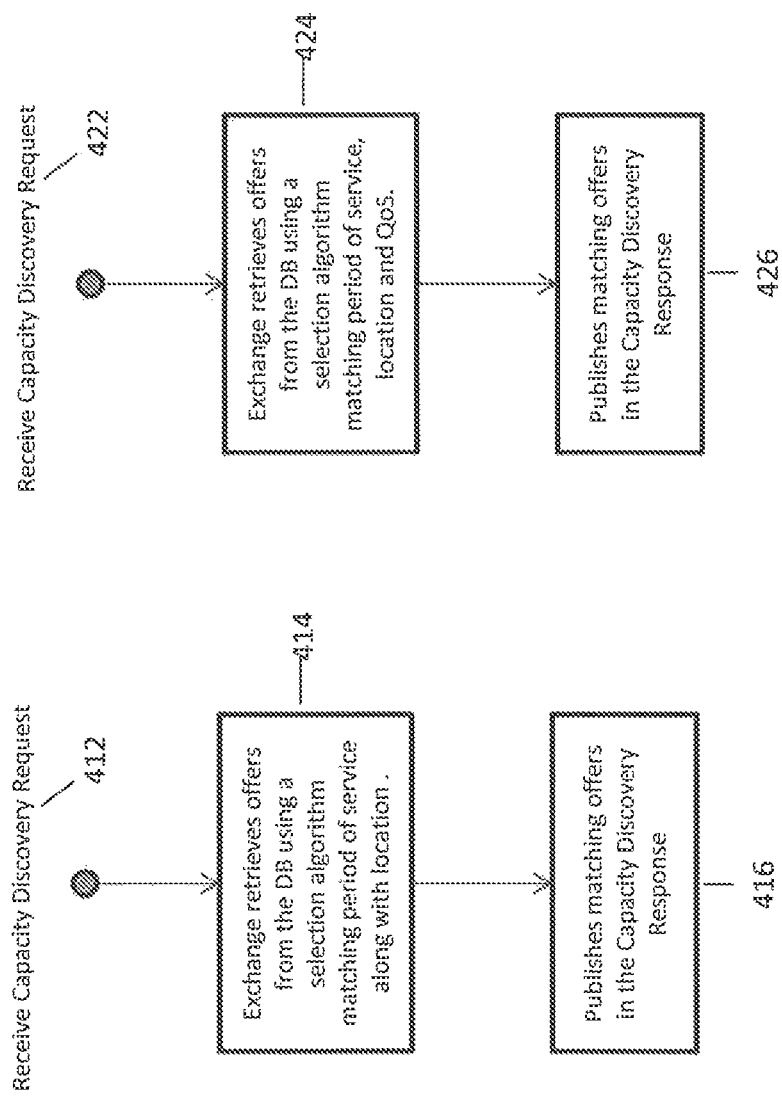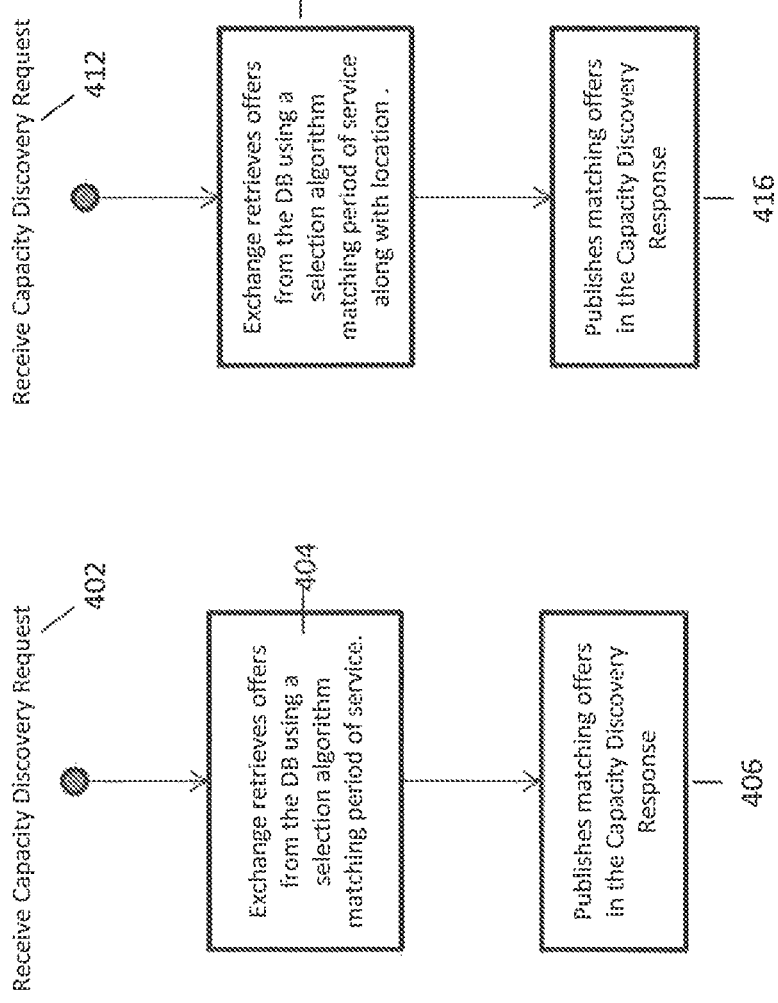

Processing of Purchased Service Quantity in HLR

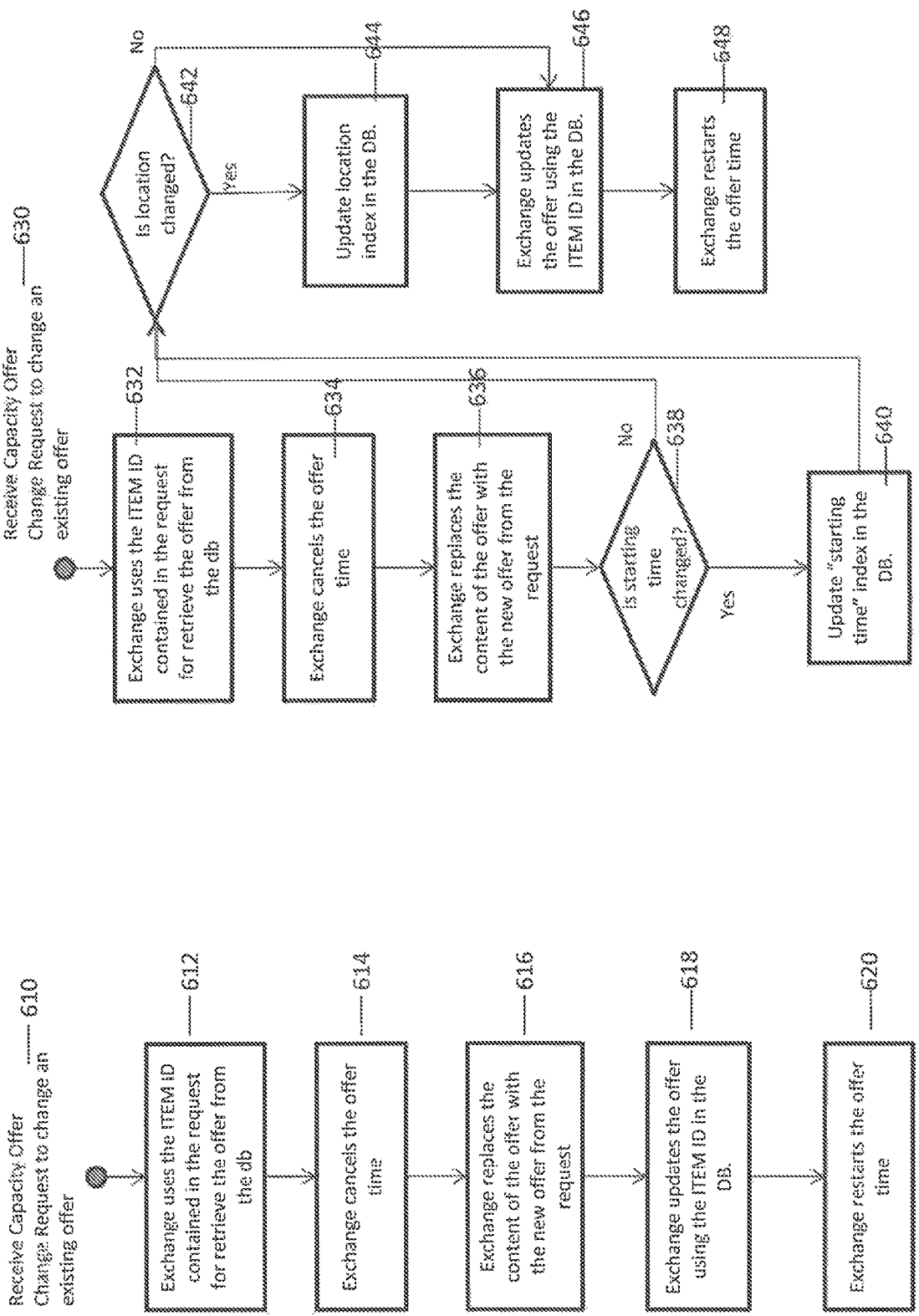

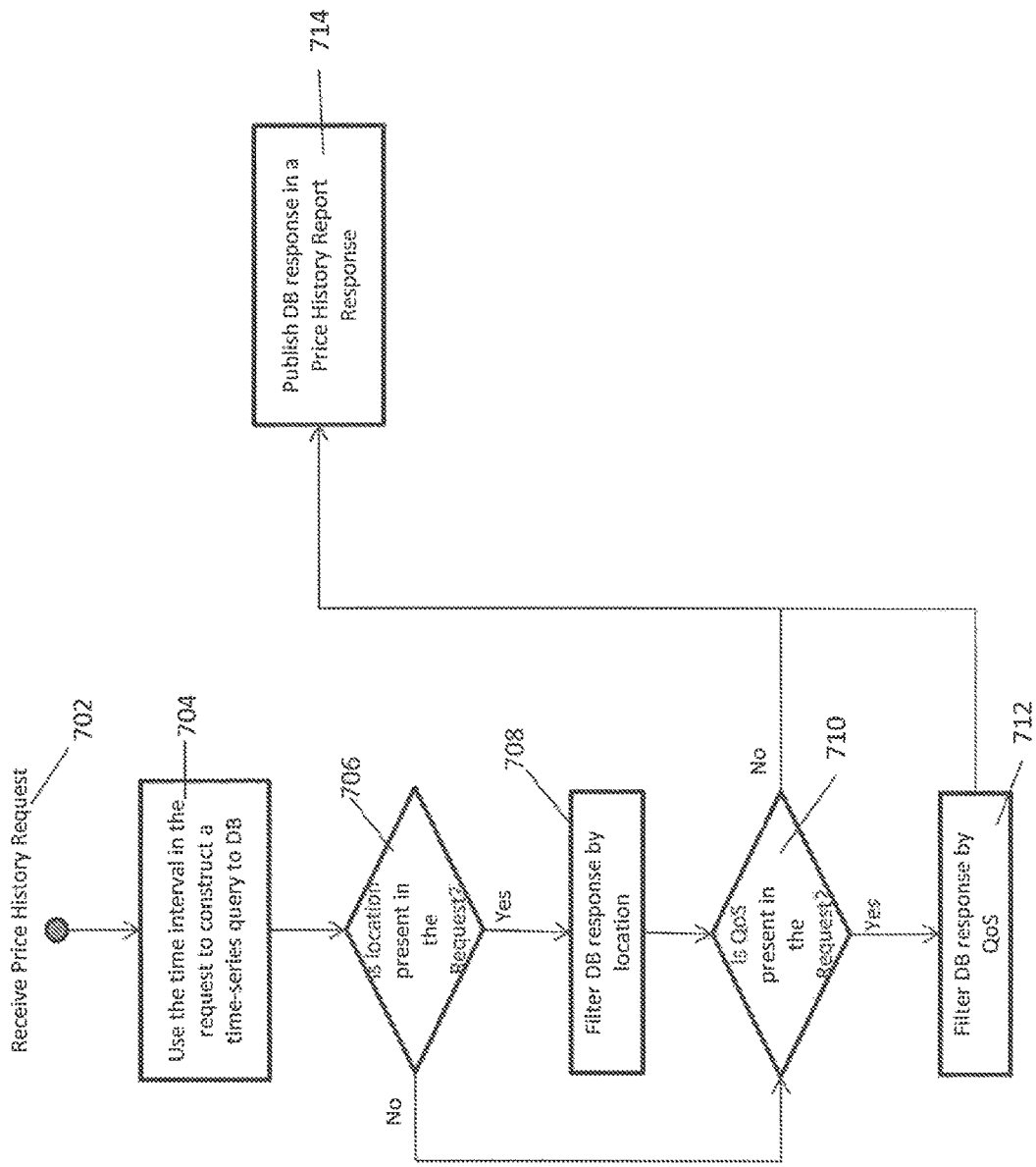

US 10,832,297 B2

REAL-TIME PRICED (RTP) CELLULAR SERVICE MARKETPLACE

CROSS-REFERENCE TO RELATED APPLICATIONS

This application is a Continuation of U.S. application Ser. No. 14/207,209, filed Mar. 12, 2014, which claims the benefit of priority to U.S. Provisional Application Ser. No. 61/780,211, filed on Mar. 13, 2013, which are hereby incorporated by reference in their entirety.

FIELD OF THE INVENTION

The present invention is directed generally to cellular networks and more particularly to facilitating the purchase of cellular service in real time.

BACKGROUND

Many users of devices attaching to and accessing cellular networks enter into service contracts with cellular service providers that permit use during a given time period of a specified quantity of voice minutes, messages and/or data for a set fee. Subscribers to cellular networks often are in a position where either they expect that they will not use some of the purchased capacity within the given time period, resulting in wasted money, or they will go over the permitted amounts and need to purchase excess plan capacity at high overage rates charged by cellular service providers. Accordingly, there is a need for a method and system that would allow a subscriber to either sell its excess capacity or selectively buy additional capacity on a real time basis. The method and system should be cost effective, efficient and adaptable to existing environments. The present invention addresses such a need.

SUMMARY OF THE INVENTION

A computer-implemented method and system for buying and selling real time priced cellular service is disclosed. The computer-implemented method and system comprise storing at least one offer for a specified amount of capacity for cellular service available from a specified cellular service provider at a specified price (a capacity offer) initiated by at least one seller, and processing at least one request to discover such capacity offers (a capacity discovery request) initiated by at least one buyer for a quantity of cellular service available from a specified cellular service provider.

The processing of the capacity discovery requests further comprises matching at least one of the capacity discovery requests with one of the stored capacity offers; wherein when a match occurs the buyer is notified of the match and price and is given the opportunity to purchase the quantity of cellular service offered by the seller. The computer-implemented method and system further comprises deducting the purchased quantity of cellular service from a service profile of the seller and adding the purchased quantity of cellular service to a service profile of the buyer.

BRIEF DESCRIPTION OF THE DRAWINGS

FIG. 1 is a flow diagram illustrating an example of a capacity offering and a capacity discovery request for the real-time priced cellular service using an exchange.

FIG. 2a illustrates creation of a capacity offer in the home location register of a cellular service provider according to an embodiment of the present invention.

FIG. 2b illustrates creation of an offer including location in addition to time, according to another embodiment of the invention.

FIG. 4a illustrates the process of matching and publishing of an offer in response to a capacity discovery request initiated by a buyer according to an embodiment of the invention.

FIG. 4b illustrates the process of matching and publishing of an offer in response to a capacity discovery request initiated by a buyer including location along with price and duration of service, according to another embodiment of the invention.

FIG. 4c illustrates the process of matching and publishing of an offer in response to a capacity discovery request initiated by a buyer including quality of service (QoS) in addition to time and location, according to yet another embodiment of the invention.

FIG. 6a illustrates a method for the exchange to process a change to a capacity offer according to an embodiment of the invention.

FIG. 6b illustrates a method for the exchange to process a change to a capacity offer according to another embodiment of the invention.

FIG. 7 illustrates the creation of price history report at the request of either the seller or the buyer.

DETAILED DESCRIPTION

Figure 3:
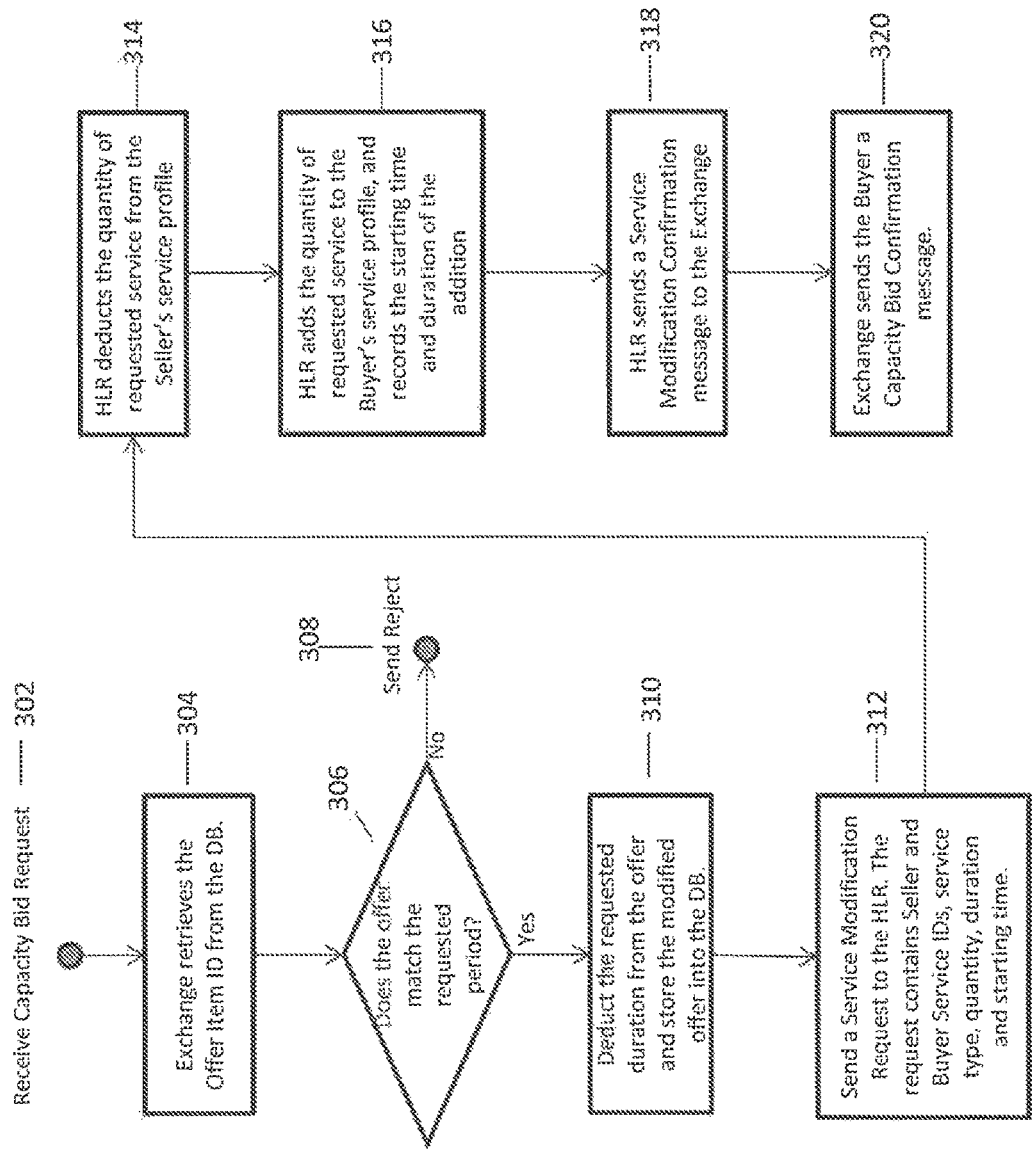
FIG. 3 is a flow diagram illustrating a method of processing capacity discovery requests and capacity offers.

The present invention is directed generally to cellular networks and more particularly to facilitating the purchase of cellular service in real time. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Given the proliferation of devices using cellular services, in the consumer, M2M and other markets, and the loss of resources both by users who spend money for unused capacity and by users who must pay for overage at high rates, it would be advantageous to provide a system and method for enabling the transfer of excess capacity. A system and method in accordance with the present invention utilize an exchange market operated by cellular service providers or other authorized parties (an exchange) that allows subscribers who have excess plan voice minutes, messages and bytes of data etc. to sell such excess to the subscribers who need them without either having to change their service contracts with their cellular service providers. An exchange is defined as a system that allows subscribers to buy and sell cellular service. The system, for example, can be operated by a cellular service provider or other authorized party. The subscribers, for example, can be any of network service providers, enterprises and consumers.

In one or more embodiments, a computer-implemented method and system are disclosed. The computer-implemented method and system allow subscribers whose contracts with a cellular service provider permit use of a specified quantity of voice minutes, messages and/or data for a set fee to use an exchange to sell excess plan voice minutes, messages, bytes of data, etc., giving rise to real-time priced cellular service for cellular subscribers, without any change to the subscribers' contracts and price plans with their cellular service providers. The computer-implemented method and system describe a network control scheme to support a real-time market for service offered at then-current real-time prices.

In an embodiment, a buyer and a seller with active subscriptions and cellular service profiles from the same cellular service provider are eligible for selling and purchasing the excess plan voice minutes, messages, bytes of data, etc. offered by the seller. The seller's subscription and service profile may be identified by an international mobile subscriber identifier (IMSI) or mobile identification number (MIN). Using the method enabled, the seller submits an offer to the exchange for sale at a given price of a quantity of excess voice minutes, short messages (SMS) or data valid for use within a specified time period. In one or more embodiments, the specified time period during which the cellular service offered is valid for use can be in multiples of one hour.

As part of an offer process, the seller also specifies cellular service profile identifiers associated with the offer. The exchange then publishes all offers in a continuous 24 hour window. A buyer enters the market through submitting a request specifying the quantity of voice minutes, messages and/or data required and a price range for this service that the buyer is willing to pay. As part of a request process, the buyer also specifies its service provider identifiers for the service profile that would use the purchased capacity. The computer-implemented method and system enables the exchange to find the lowest-priced offer that matches the buyer's requirements.

Once a matching offer is found, the exchange uses the computer-implemented method and system to complete the transaction and store any desired information, which may include the parties' respective service provider identifiers, quantity of service purchased, price and so on. In a method and system in accordance with an embodiment, the exchange then adjusts the service profiles of both the seller (deducting the quantity of service sold from available amounts) and the buyer (adding the purchased capacity to the available amounts). Accordingly in an embodiment, an offer is allowed either to be taken off the market if quantities in the offer have been matched with at least one buyer or adjusted so that purchased amounts are removed. At the end of the purchased service period, the exchange removes the unused portion of the purchased service quantity from the buyer's service profile, without any further change to the seller's service profile. Payment settlement between the seller and buyer can be performed via a mechanism chosen and implemented by the exchange.

To describe the features of a system and method in accordance with the present invention in more detail, refer now to the following description in conjunction with the accompanying figures.

FIG. 1 is a flow diagram illustrating an example of a capacity offering and a capacity discovery request for the real-time priced cellular service using an exchange. First, a seller 102 initiates submission of an offer to a home location register (HLR) 106 of cellular service provider specifying a quantity of excess voice minutes, messages or data to be available for use for a fixed duration at a given price via step 110. In an embodiment, the period during which the offered cellular service is valid for use can be in multiples of one hour. The seller 102 may also specify cellular service profile identifiers associated with the offer. In addition, in an embodiment the seller 102 is allowed to change the offer after it is submitted. Exchange 106, which can be an exchange stores the request via step 112 and publishes all offers over a specified time period, for example, 24 hours, via step 116.

A buyer 108 initiates a capacity discovery request, for example, for any of quantity of voice minutes, messages and data required and the maximum price the buyer 108 is willing to pay, via step 114. The buyer 108 also specifies its service profile identifiers for the service profile that would use the purchased capacity. In an embodiment, the lowest priced offer that matches the requirements of the buyer 108 is determined. If a matching offer is determined, exchange 106 notifies the buyer 108 of the matching offer by sending a capacity discovery response to the buyer 108, via step 118. The buyer 108 accepts the offer by sending a capacity bid request, via step 120 to the exchange 106, which then sends a service transfer request, via step 122 to HLR 104. The HLR 104 then sends a service transfer confirmation, via step 124 to the exchange 106 which in turn sends a capacity purchase confirmation to the buyer 108, via step 126. The offer is taken off the market after expiration of the offer or sooner if quantities in the offer have been matched with at least one buyer 108.

In an embodiment, the purchased service quantity will be deducted from the service profile of the seller 102, and that the purchased service quantity will be added to the service profile of the buyer 108. The purchased service quantity is associated with duration of time for which it is available for use. At the end of the duration of the purchased service quantity, the HLR 104 removes the unused portion of the purchased service quantity from the service profile of the buyer 108, without any further change to the service profile of the seller 102.

FIG. 2a illustrates creation of an offer in home location register (HLR) in accordance with an embodiment. First, a seller 102 initiates an offer to sell a quantity of service available for use during a specified period of time for a specified price, a capacity offer, in HLR 104 via step 110, as shown in FIG. 1. Once the HLR receives a capacity offer request initiated by the seller, via step 202, it creates an item identifier (item ID) for that offer, via step 204. The HLR then stores the item ID along with the offer in a database, via step 206. Offers may be indexed for example by starting time in the database. The HLR then starts a timer with the duration of the period during which the offered service is valid for use as specified and the offer is removed from the database when the timer expires via step 208.

FIG. 2b illustrates creation of an offer including location in addition to time, according to an embodiment of the invention. A location-based offering indicates that the service will only be provided at the offer price in a specific geographic location. A specific geographical location can be described as a point which is exact location defined by longitude and latitude, or longitude, latitude and altitude. A geographical location can also be defined as circular, for example, within a radius of 5 miles, or as a polygon defined by boundaries. The location can also be defined by cellular service identifier such as international mobile subscriber identifier (IMSI) or mobile identification number (MIN). For example, in case wireless mode of communication, cellular identifier defines a location.

First, a seller 102 initiates an offer to sell a quantity of service available for use during a specified period of time, within a specified geographic location for a specified price, a capacity offer, in HLR 104 via step 110, as shown in FIG. 1. Once the HLR receives a capacity offer request initiated by a seller, via step 212, it creates an item identifier (item ID) for that offer, via step 214. The HLR then stores the item ID along with the offer in a database, via step 216. At this point, the offers may be indexed for example by starting time in the database. The HLR further checks for a location parameter in the offer via step 218. If the offer specifies a location parameter, the offers may be further indexed for example by location in the database via step 220. The HLR then starts a timer with the duration of the period during which the offered service is valid for use as specified and the offer is removed from the database when the timer expires via step 222.

FIG. 3 is a flow diagram illustrating processing capacity discovery requests and capacity offers. Processing of capacity discovery requests and capacity offers begins by matching and publishing capacity offers via step 116 as shown in FIG. 1 and continues with further processing involving addition of purchased quantity to the service profile of a buyer 108 and deducting the same from the service profile of a seller 102. FIG. 3 is a detailed illustration of this process. Bidding starts when an exchange receives a capacity discovery request initiated by a buyer also known as capacity bid request 302.

The exchange then retrieves all capacity offers from the database via step 304 and through a method checks if the capacity bid request matches any capacity offers via step 306. Each capacity offer that does not match the capacity bid request in one or more parameters is rejected via step 308. If a capacity offer matches the capacity bid request, it then deducts the requested capacity from the offer and stores the modified offer into the database via step 310. The exchange then sends a service modification request to the home location register (HLR) via step 312.

The request may contain seller and buyer's service profile identifiers and other information about the offer and bid, such as service type and quantity and the time period during which the purchased capacity is valid. The HLR then deducts the quantity of requested service from the seller's service profile via step 314; and adds the quantity of requested service to the buyer's service profile, and records the starting time and duration of the period during which the requested service is valid via step 316. HLR then sends service modification confirmation message to the exchange via step 318, which in turn sends the buyer a capacity bid confirmation message via step 320.

FIG. 4a illustrates the process of matching and publishing of an offer in response to a capacity discovery request initiated by a buyer. Once an exchange receives a capacity discovery request initiated by a buyer step 402, it retrieves offers from the database using a selection algorithm which matches the requested parameters, such as period during which the offered service is valid for use, via step 404. An example of a selection algorithm is shown below.

Selection Algorithm:
Select offers that match the condition below:
$EndingTime_{Discovery} < StartingTime_{Offer} < StartingTime_{Discovery}$ The exchange then publishes matching offers in the capacity discovery response, via step 406. An example of a publishing algorithm is shown below.

Offer publishing algorithm:
(1) Calculate the nearest hours to the $StartingTime_{Discovery}$ and $EndingTime_{Discovery}$.
(2) Construct an interval in the range: $[StartingHour_{Discovery}, EndingHour_{Discovery}]$
(3) For each hour in the range, construct a tuple in the following format:
Hour, Item ID, Price
(4) Send the list of tuples in the Capacity Discovery Response.

FIG. 4b illustrates the process of matching and publishing of an offer in response to a capacity discovery request initiated by a buyer including location along with price, quantity and duration of service, according to another embodiment of the invention. Once an exchange receives a capacity discovery request initiated by a buyer step 412, it retrieves offers from the database using selection algorithm which matches the requested parameters, such as period during which the offered service is valid for use, distance between the offer location and the discovery request location via step 414. An example of a selection algorithm is shown below.

Selection Algorithm:
Select offers that match both conditions below:
(1) $EndingTime_{Discovery} >= StartingTime_{Offer} <= StartingTime_{Discovery}$
(2) Distance between $Offer_{location}$ and $Discovery_{Location} <= Distance_{Discovery}$ However, if the offer does not contain a location, or a discovery request does not specify a location or distance, the second condition in the algorithm as shown will always be true.

The exchange then publishes matching offers in the capacity discovery response, via step 416. An example of a publishing algorithm for location along with duration of time of service is shown below.

Offer publishing algorithm:
(1) Calculate the nearest hours to the $StartingTime_{Discovery}$ and $EndingTime_{Discovery}$.
(2) Construct an interval in the range: $[StartHour_{Discovery}, EndingHour_{Discovery}]$
(3) For each hour in the range, construct a tuple in the following format:
Hour, Item ID, Price, Location (if present)
(4) Send the list of tuples in the Capacity Discovery Response.

FIG. 4c illustrates the process of matching and publishing of an offer in response to a capacity discovery request initiated by a buyer including quality of service (QoS) in addition to price, quantity, duration of service and location of service, according to an embodiment of the invention. Once an exchange receives a capacity discovery request initiated by a buyer step 422, it retrieves offers from the database using a selection algorithm which matches the requested parameters, such as period during which the offered service is valid for use, distance between the offer location and the discovery request location and QoS via step 424. An example of the selection algorithm is shown below.

Selection Algorithm:
Select offers that match both conditions below:
(1) $EndingTime_{Discovery} >= StartingTime_{Offer} >= StartingTime_{Discovery}$
(2) Distance between $Offer_{Location}$ and $Discovery_{Location} <= Distance_{Discovery}$
(3) $QoS_{Offer}$ is equal to $QoS_{Discovery}$ However, if the offer does not contain a location, or a discovery request does not specify a location or distance, the second condition in the algorithm as shown will always be true. Similarly, if the offer does not contain QoS, or a discovery request does not specify QoS, the third condition in the algorithm as shown will always be true.

The exchange then publishes matching offers in the capacity discovery response, via step 426. An example of a publishing algorithm for QoS along with duration of time and location of service is shown below.

Offer publishing algorithm:
(1) Calculate the nearest hours to the $StartingTime_{Discovery}$ and $EndingTime_{Discovery}$.
(2) Construct an interval in the range: [$StartingHour_{Discovery}$, $EndingHour_{Discovery}$]
(3) For each hour in the range, construct a tuple in the following format:
Hour, Item ID, Price, Location (if present), QoS (if present)
(4) Send the list of tuples in the Capacity Discovery Response.

Figure 5A:
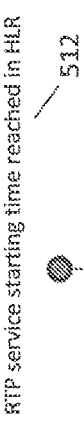
FIG. 5a illustrates the processing of offers to purchase and sale of service valid during specified time period in the home location register of the cellular service provider.

FIG. 5a illustrates the processing of offers to purchase and sale of service valid during specified time period in the HLR of the cellular service provider. Once starting time for when the purchased service valid is reached step 502, HLR starts a timer to mark the effectiveness of the new capacity in buyer's service profile via step 504. When the timer expires, the HLR deducts the capacity addition from the buyer's service profile via step 506. This ensures that the capacity the buyer purchased does not go beyond the period during which the capacity is valid for use.

Figure 5B:
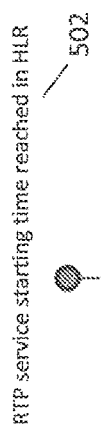
FIG. 5b illustrates the processing of offers to sell and buy service valid during specified time period along with location in the HLR.

FIG. 5b illustrates the processing of offers to sell and buy service valid during specified time period along with location in the HLR. Once starting time for when the purchased service valid is reached step 512, HLR starts a timer to mark the effectiveness of the new capacity in buyer's service profile via step 514. HLR checks if the purchased quantity of service is location enabled via step 516, if it is, HLR pulls and records the location of the device every hour during the service period via step 518, allowing the HLR to meter the device with a different price if the device is outside the service area for which the service is purchased. When the timer expires, HLR deducts the capacity addition from the buyer's service profile via step 520. This ensures that the capacity the buyer purchased does not go beyond it's the period during which the capacity is valid for use.

It may be desirable for the seller to change the capacity offer parameters of the offer or the portion of the offer before the purchase of the service quantity by the buyer. FIG. 6a illustrates a first method for the exchange to process a change to a capacity offer according to an embodiment of the invention. Sellers can change parameters of the offer or the portion of the offer including price and "start" and "stop" period i.e. duration of the service any time before the purchase of the service quantity by the buyer. The capacity offer change request can be either initiated by the seller, or by the exchange as part of post-sale processing of the offer, via step 610. The exchange then uses an item ID contained in the request to retrieve the offer from the database, via step 612. The offer is then cancelled via step 614, and the content of the offer is replaced, for example, price or duration of the service with the new offer from the request via step 616. The offer is then updated, via step 618 using the item ID in the database and the offer time is restarted, step 620.

FIG. 6b illustrates a second method for the exchange to process a change to a capacity offer according to an embodiment of the invention. As illustrated in FIG. 6b, the home location register can make changes to the offer based on any of the parameters comprising duration of the service offered, location of the service offered, quality of service offered in addition to price, quantity and start time (not shown in figure). Sellers can change any of the parameters of the offer or the portion of the offer including but not limited to price, "start" and "stop" time i.e. duration of the service, location and quality of service any time before the purchase of the service quantity by the buyer. Therefore, the capacity offer change request can be either initiated by the seller, or by the exchange as part of post-sale processing of the offer, via step 630.

The exchange then uses an item ID contained in the request to retrieve the offer from the database, via step 632. The exchange then cancels the offer via step 634, and replaces the content of the offer with the new offer from the request via step 636. Exchange then checks for the change in starting time via step 638. If the starting time has changed the exchange updates starting time index in the database via step 640. The Exchange also checks for the change in location via step 642. If the location has changed the exchange updates location index in the database via step 644. Exchange then updates the offer via step 646 using the item ID in the database and restarts the offer time, step 648.

It may be desirable for a seller or a buyer to know historical data related to price based on parameters such as quantity, duration, location and quality of service before initiating either a capacity offer or a capacity request. A seller may also desire to request such history before initiating a request for change. FIG. 7 illustrates the creation of price history report at the request of either the seller or the buyer. The method and system enable a buyer or seller to come up with a price associated with the service to be purchased or sold. As the exchange receives a price history request via step 702; it uses the time interval in the request to construct a time-series query to the database via step 704. It may check if the location is present in the request via step 706, if the location is present; it filters the database response by location via step 708. It may also check if the QoS is present in the request via step 710, if the QoS is present; it filters the database response by QoS via step 712. As shown in the figure, steps 706 and 710 are carried out independent of each other. The exchange then publishes the database response as a price history report via step 714. An example of algorithm used to create a price history report is shown below.

History report algorithm:
(1) Calculate the nearest hours to the $StartingTime_{request}$ and $EndingTime_{request}$.
(2) Construct an interval in the range: [$StartingHour_{request}$, $EndingHour_{request}$]
(3) For each hour in the range, construct a tuple in the following format:
Hour, Item ID, Purchase Price, Location (if present), QoS (if present)
(4) Send the list of tuples in the History Report Response.

Figure 8:
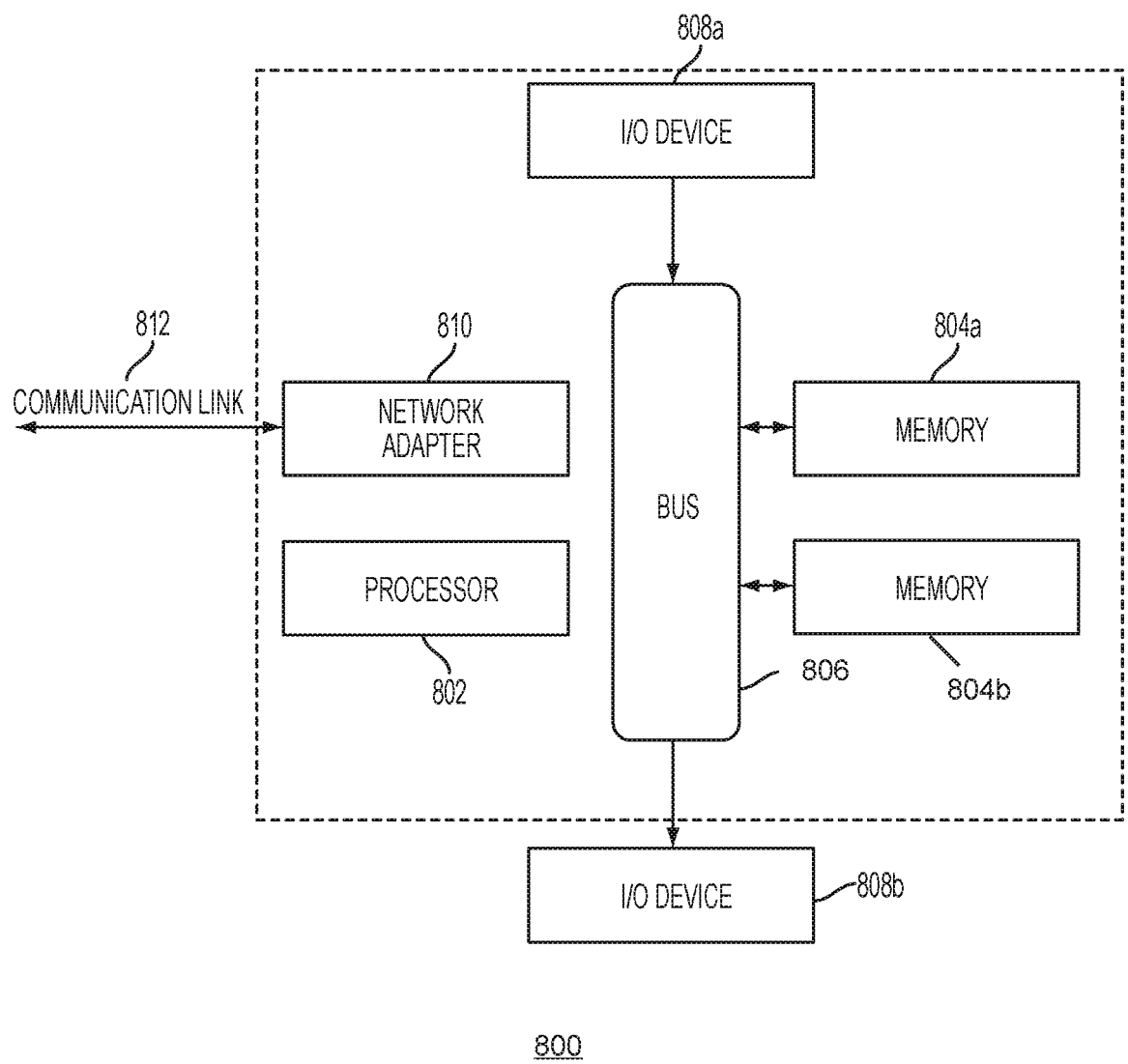
FIG. 8 illustrates a data processing system suitable for storing the computer program product and/or executing program code in accordance with an embodiment of the invention.

FIG. 8 illustrates a data processing system 800 suitable for storing the computer program product and/or executing program code in accordance with an embodiment of the present invention. The data processing system 800 includes a processor 802 coupled to memory elements 804*a-b* through a system bus 1106. In other embodiments, the data processing system 800 may include more than one processor and each processor may be coupled directly or indirectly to one or more memory elements through a system bus.

Memory elements 804*a-b* can include local memory employed during actual execution of the program code, bulk storage, and cache memories that provide temporary storage of at least some program code in order to reduce the number of times the code must be retrieved from bulk storage during execution. As shown, input/output or I/O devices 808*a-b* (including, but not limited to, keyboards, displays, pointing devices, etc.) are coupled to the data processing system 800. I/O devices 808*a-b* may be coupled to the data processing system 800 directly or indirectly through intervening I/O controllers (not shown).

In FIG. 8, a network adapter 810 is coupled to the data processing system 802 to enable data processing system 802 to become coupled to other data processing systems or remote printers or storage devices through communication link 812. Communication link 812 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present disclosure in more detail refer now to the following description in conjunction with the accompanying Figures.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications network includes communications across a network (such as that of a M2M but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks.

CONCLUSION

A system and method in accordance with the present invention utilizes an exchange market operated by cellular service providers or other authorized party. The system and method allow subscribers who have excess plan voice minutes, messages and bytes of data etc. to sell such excess to the subscribers who need them without either the seller or buyer having to change their service contracts, thereby preventing loss of resources both by users who spend money for unused capacity and by users who must pay for overage at high rates. Payment settlement between the seller and buyer can be performed via a mechanism chosen and implemented by the exchange.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

What is claimed is:

1. A computer-implemented method for buying and selling cellular service, comprising:
   receiving and storing at least one capacity offer for a quantity of cellular service initiated by at least one seller, wherein the at least one seller is a first buyer who has purchased an excess quantity of cellular service including the quantity of cellular service from a cellular service provider;
   processing one or more capacity discovery requests initiated by one or more buyers for a quantity of cellular service, wherein the one or more buyers are subsequent buyers of the cellular service;
   matching at least one of the one or more capacity discovery requests with at least one of the stored capacity offers; wherein one of the one or more buyers purchases the offered quantity of cellular service;
   deducting the quantity of cellular service purchased by the one of the one or more buyers from the service profile of the at least one seller; and
   adding the purchased quantity of cellular service to the service profile of the one of the one or more buyers.

2. The computer-implemented method of claim 1, further comprising:
   storing an effective quantity and duration of validity of the purchased cellular service with the service profile identifiers of the at least one seller and the one of the one or more buyers,
   deducting the purchased quantity of cellular service from the service profile of the at least one seller, and adding the purchased quantity of cellular service to the service profile of the one of the one or more buyers at the effective time of service for the purchased quantity of cellular service; and removing the added quantity of cellular service from the service profile of the one of the one or more buyers at the end of the period during which the added cellular service is valid.

3. The computer-implemented method of claim 1, further comprising:

deducting the purchased quantity of cellular service from the matched capacity offer, storing the changed capacity offer for further matching, and taking the stored capacity offer off of the market once all quantities in the capacity offer have been matched with at least one of the one or more capacity discovery requests.

4. The computer-implemented method of claim 1, further comprising:

deducting the purchased quantity of cellular service from the matched capacity offer, storing the changed capacity offer for further matching, and taking the stored capacity offer off of the market once the period during which the offered capacity is valid has expired.

5. The computer-implemented method of claim 1, further comprising:

canceling the at least one capacity offer for cellular service as requested by the at least one seller, replacing content of the at least one capacity offer with content of a new offer from the request, storing the new capacity offer for further matching, and taking the stored new capacity offer off of the market once the capacity offer has been matched with at least one of the one or more capacity discovery requests.

6. The computer-implemented method of claim 5, wherein the content of the capacity offer comprises any of: price, quantity of service, duration of service, location of service and quality of service.

7. The computer-implemented method of claim 1, further comprising:

canceling the at least one capacity offer for cellular service as requested by the at least one seller, replacing content of the at least one capacity offer with content of a new offer from the request, storing the new capacity offer for further matching, and taking the stored new capacity offer off of the market once the period during which the offered capacity is valid has expired.

8. The computer-implemented method of claim 7, wherein the content of the capacity offer comprises any of: price, quantity of service, duration of service, location of service and quality of service.

9. The computer-implemented method of claim 1, wherein the one or more buyers is a network service provider and the at least one seller is a second network service provider.

10. The computer-implemented method of claim 1, wherein the one or more buyers is an enterprise and the at least one seller is a second enterprise.

11. A computer-implemented system for buying and selling cellular service, comprising:

a processor, and a memory in communication with the processor wherein the memory containing program instructions which when executed by the processor, perform the following operations comprising:

receiving and storing at least one capacity offer for a quantity of cellular service initiated by at least one seller, wherein the at least one seller is a first buyer who has purchased an excess quantity of cellular service including the quantity of cellular service from a cellular service provider;

processing one or more capacity discovery requests initiated by one or more buyers for a quantity of cellular service, wherein the one or more buyers are subsequent buyers of the cellular service;

matching at least one of the one or more capacity discovery requests with at least one of the stored capacity offers; wherein one of the one or more buyers purchases the offered quantity of cellular service;

deducting the quantity of cellular service purchased by the one of the one or more buyers from the service profile of the at least one seller; and adding the purchased quantity of cellular service to the service profile of the one of the one or more buyers.

12. The computer-implemented system of claim 11, further comprising program instructions for:

storing effective quantity and, duration of validity of the purchased cellular service with the service profile identifiers of the at least one seller and the one of the one or more buyers, deducting the purchased quantity of cellular service from the service profile of the at least one seller, and adding the purchased quantity of cellular service to the service profile of the one of the one or more buyers at the effective time of service for the purchased quantity of cellular service; and removing the added quantity of cellular service from the service profile of the one of the one or more buyers at the end of the period during which the added cellular service is valid.

13. The computer-implemented system of claim 11, further comprising program instructions for:

deducting the purchased quantity of cellular service from the matched capacity offer, storing the changed capacity offer for further matching, and taking the stored capacity offer off of the market once all quantities in the stored capacity offer have been matched with at least one of the one or more capacity discovery requests.

14. The computer-implemented system of claim 11, further comprising program instructions for:

deducting the purchased quantity of cellular service from the matched capacity offer, storing the changed capacity offer for further matching, and taking the stored capacity offer off of the market once the period during which the offered capacity is valid has expired.

15. The computer-implemented system of claim 11, further comprising program instructions for:

canceling the at least one capacity offer for cellular service as requested by the at least one seller, replacing content of the at least one capacity offer with content of a new offer from the request, storing the new capacity offer for further matching, and taking the stored new capacity offer off of the market once the stored new capacity offer has been matched with at least one of the one or more capacity discovery requests.

16. The computer-implemented system of claim 15, wherein the content of the capacity offer comprises any of: price, quantity of service, duration of service, location of service and quality of service.

17. The computer-implemented system of claim 11, further comprising program instructions for:

canceling the at least one capacity offer for cellular service as requested by the at least one seller, replacing content of the at least one capacity offer with content of a new offer from the request, storing the new capacity offer for further matching, and taking the stored new capacity offer off of the market once the period during which the offered capacity is valid has expired.

18. The computer-implemented system of claim 17, wherein the content of the capacity offer comprises any of: price, quantity of service, duration of service, location of service and quality of service.

19. The computer-implemented system of claim 11, wherein the one or more buyers is a network service provider and the at least one seller is a second network service provider.

20. The computer-implemented system of claim 11, wherein the one or more buyers is an enterprise and the at least one seller is a second enterprise.

21. A computer program product stored on a computer readable medium for buying and selling cellular service, comprising computer readable programming for causing a computer to control an execution of an application for buying and selling cellular services comprising:

receiving and storing at least one capacity offer for cellular service initiated by at least one seller, wherein the at least one seller is a first buyer who has purchased an excess quantity of cellular service including the quantity of cellular service from a cellular service provider;

processing one or more capacity discovery requests initiated by one or more buyers for a quantity of cellular service, wherein the one or more buyers are subsequent buyers of the cellular service;

matching at least one of the one or more capacity discovery requests with the at least one of the stored capacity offers; wherein one of the one or more buyer purchases the offered quantity of cellular service;

deducting the quantity of cellular service purchased by the one of the one or more buyers from the service profile of the at least one seller; and adding the purchased quantity of cellular service to the service profile of the one of the one or more buyers.

22. The computer program product of claim 21, further comprising instructions for:

storing effective quantity and duration of validity of the purchased cellular service with the service profile identifiers of the at least one seller and the one of the one or more the buyers, deducting the purchased quantity of cellular service from the service profile of the at least one seller, and adding the purchased quantity of cellular service to the service profile of the one of the one or more buyers at the effective time of service for the purchased quantity of cellular service; and removing the added quantity of cellular service from the service profile of the one of the one or more buyers at the end of the period during which the added cellular service is valid.

23. The computer program product of claim 21, further comprising instructions for:

deducting the purchased quantity of cellular service from the matched capacity offer, storing the changed capacity offer for further matching, and taking the stored capacity offer off of the market once all quantities in the capacity offer have been matched with at least one of the one or more capacity discovery requests.

24. The computer program product of claim 21, further comprising instructions for:

deducting the purchased quantity of cellular service from the matched capacity offer, storing the changed capacity offer for further matching, and taking the stored capacity offer off of the market once the period during which the offered capacity is valid has expired.

25. The computer program product of claim 21, further comprising instructions for:

canceling the at least one capacity offer for cellular service as requested by the at least one seller, replacing content of the at least one capacity offer with content of a new offer from the request, storing the new capacity offer for further matching, and taking the stored new capacity offer off of the market once the stored new capacity offer has been matched with at least one of the one or more capacity discovery requests.

26. The computer program product of claim 25, wherein the content of the capacity offer comprises any of: price, quantity of service, duration of service, location of service and quality of service.

27. The computer program product of claim 21, further comprising instructions for:

canceling the at least one capacity offer for cellular service as requested by the at least one seller, replacing content of the at least one capacity offer with content of a new offer from the request, storing the new capacity offer for further matching, and taking the stored new capacity offer off of the market once the period during which the offered capacity is valid has expired.

28. The computer program product of claim 27, wherein the content of the capacity offer comprises any of: price, quantity of service, duration of service, location of service and quality of service.

29. The computer program product of claim 21, wherein the one or more buyers is a network service provider and the at least one seller is a second network service provider.

30. The computer program product of claim 21, wherein the one or more buyers is an enterprise and the at least one seller is a second enterprise.

* * * * *